US009262044B2

(12) United States Patent
Gomersall et al.

(10) Patent No.: US 9,262,044 B2
(45) Date of Patent: Feb. 16, 2016

(54) METHODS, SYSTEMS, AND USER INTERFACES FOR PROMPTING SOCIAL VIDEO CONTENT INTERACTION

(71) Applicant: FACEBOOK, INC., Menlo Park, CA (US)

(72) Inventors: Christopher Gomersall, Playa Vista, CA (US); Howard Stein, Santa Monica, CA (US)

(73) Assignee: FACEBOOK, INC., Menlo Park, CA (US)

( * ) Notice: Subject to any disclaimer, the term of this patent is extended or adjusted under 35 U.S.C. 154(b) by 130 days.

(21) Appl. No.: 13/894,800

(22) Filed: May 15, 2013

(65) Prior Publication Data
US 2014/0344694 A1 Nov. 20, 2014

(51) Int. Cl.
| G06F 3/00 | (2006.01) |
| G06F 3/0481 | (2013.01) |
| H04L 29/08 | (2006.01) |
| G06F 3/048 | (2013.01) |
| H04L 12/58 | (2006.01) |

(52) U.S. Cl.
CPC .............. *G06F 3/0481* (2013.01); *G06F 3/048* (2013.01); *H04L 51/10* (2013.01); *H04L 51/32* (2013.01); *H04L 67/10* (2013.01); *H04L 67/36* (2013.01)

(58) Field of Classification Search
CPC ....... G06F 3/0481; G06F 3/167; G06F 17/00; G06F 3/048; G06F 3/0482; G06F 3/0484; G06F 17/3074; G06F 1/00; G06F 3/165; H04L 67/10

USPC ......................................................... 715/719
See application file for complete search history.

(56) References Cited

U.S. PATENT DOCUMENTS

| 2011/0022589 A1* | 1/2011 | Bauer et al. .................... 707/723 |
| 2011/0137753 A1* | 6/2011 | Moehrle ...................... 705/27.1 |
| 2011/0173264 A1* | 7/2011 | Kelly ..................... G06Q 10/10 709/205 |
| 2012/0084807 A1* | 4/2012 | Thompson et al. ............. 725/32 |
| 2013/0232263 A1* | 9/2013 | Kelly ..................... H04L 43/10 709/224 |
| 2014/0187315 A1* | 7/2014 | Perry ...................... A63F 13/10 463/29 |
| 2014/0188742 A1* | 7/2014 | Deselaers .......... G06Q 30/0282 705/319 |

OTHER PUBLICATIONS

Yu et al., Visual Mining of Multimedia Data for Social and Behavioral Studies. © 2008; IEEE: 8 pages.*

* cited by examiner

*Primary Examiner* — Linh K Pham
(74) *Attorney, Agent, or Firm* — Nicholson De Vos Webster & Elliott LLP

(57) ABSTRACT

Methods, systems, and user interfaces facilitate social video content interaction. A video asset is optionally presented to a user of a social networking system. The video includes an audio track and a video track. Responsive to the performance of the video asset reaching a first interaction point where a representation of a person, place, or thing (PPT) is included in the audio track or depicted in the video track, an interaction user interface (UI) prompt is presented to the user that includes an interaction UI element allowing the user to provide an input that is related to the PPT. The user input that is related to the PPT is received, and a post is caused to be presented to one or more other users of the social networking system that references the user and the PPT.

18 Claims, 7 Drawing Sheets

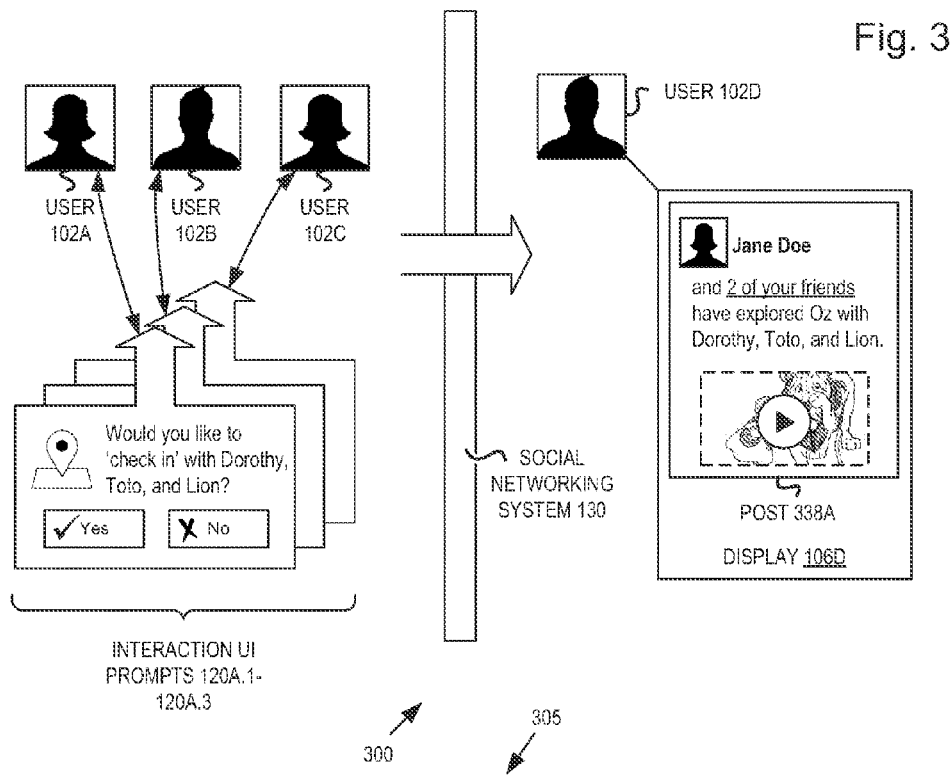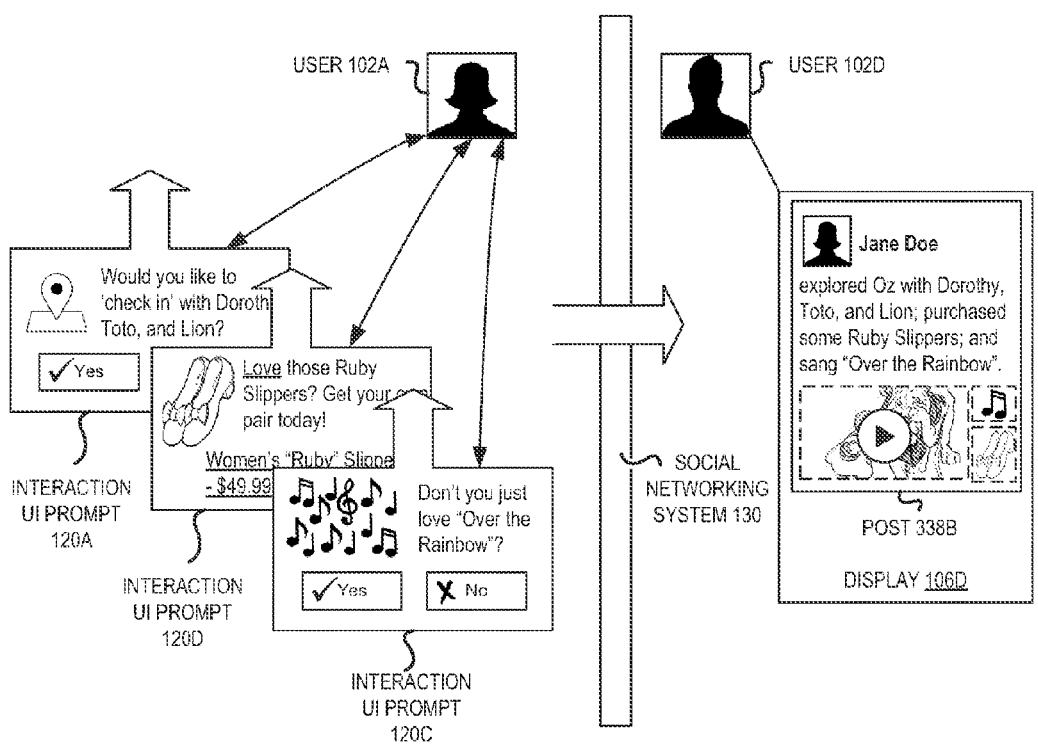
Fig. 3

METHODS, SYSTEMS, AND USER INTERFACES FOR PROMPTING SOCIAL VIDEO CONTENT INTERACTION

FIELD

Embodiments of the invention relate to multimedia and social networking; and more specifically, to methods, systems, and user interfaces for prompting social video content interaction.

BACKGROUND

In recent years, a wide variety of common human interactions and activities have moved online, and in particular, into the realm of social networks. For example, social networking systems allow users to designate other users as friends (or otherwise connect to or form relationships with other users), share photographs and opinions, discuss current events, play games, participate in discussion groups, and engage in countless other social interactions.

However, developers of social networking systems continually strive to incorporate more "real world" human behavior within social networks to improve social connections between its users, especially in a modem, mobile world where people often live or work far away from friends and family. Accordingly, finding ways to bring more typical real world interactions into the framework of social networks is of the utmost of importance.

BRIEF DESCRIPTION OF THE DRAWINGS

The invention may best be understood by referring to the following description and accompanying drawings that are used to illustrate embodiments of the invention. In the drawings:

FIG. 3 is a block diagram illustrating flow sequences and user interfaces for prompting interactions with persons, places, and/or things depicted or included in video assets and generating aggregated posts in a social networking system according to an embodiment of the invention;

DESCRIPTION OF EMBODIMENTS

As "last mile" Internet connectivity bandwidth has increased in the past few years, the ability to stream or download high-quality online video in a relatively short amount of time has led to a large increase in the demand and consumption of video content using the Internet. The sharing and viewing of video content has also entered the realm of social networking, and it has become very common for users of social networks to share personal videos, as well as video content from third parties, with other users. However, when a user views a video posted to a social networking system (or other website or application), the step of watching the video is currently a non-social, non-interactive experience. Although a user, in some systems, can typically write some sort of general comment about the video before, during, or after the viewing, the user is not enabled to directly interact with the entities in the video or easily use the social network to discuss or share information about the entities within the video. The same is true for other non-Internet based video content, such as over-the-air television content or video played from an optical disc or tape.

Detailed below are embodiments of methods, systems, and user interfaces for prompting social video content interaction. These user interfaces allow users of social networking systems to, when viewing a presentation of a video asset, interact with entities within the video asset and share these interactions with other users of the social network. Further, embodiments of the invention can automatically prompt a user during the performance of the video asset to undergo a particular interaction with an entity. By suggesting social interactions, it is easier for users to interact with the entities of the video asset and become more involved within the social network, making the video watching and social networking experience more rewarding for the user and the user's social community of other users in the social network.

Figure 1:
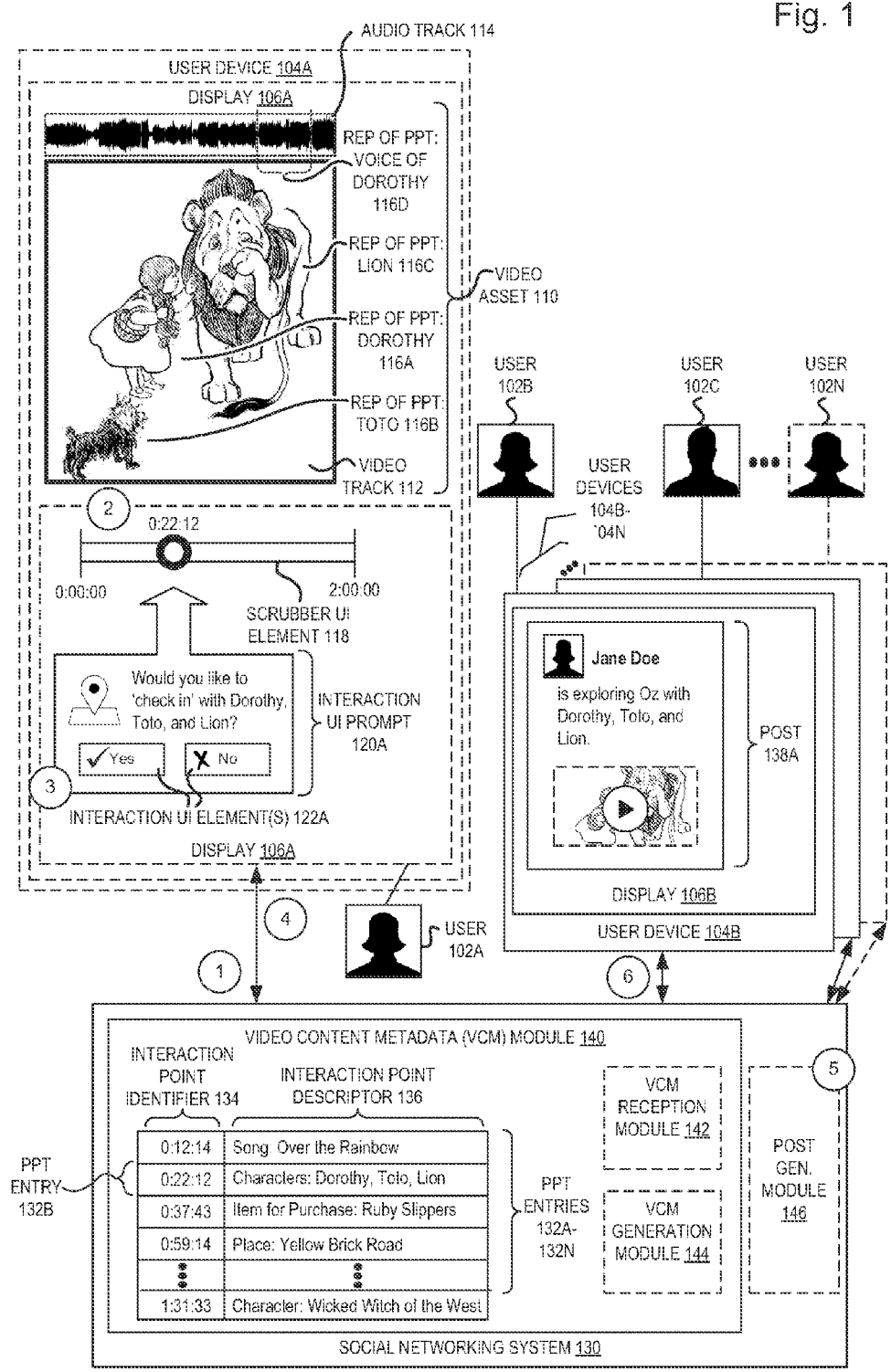
FIG. 1 is a block diagram illustrating a system for prompting interactions with persons, places, and/or things depicted or included in video assets according to an embodiment of the invention.

FIG. 1 is a block diagram illustrating a system for prompting interactions with persons, places, and/or things depicted or included in video assets according to an embodiment of the invention. In FIG. 1, a social networking system 130 is communicatively coupled through one or more networks (e.g., as illustrated in and described with reference to FIG. 6) to a plurality of user devices 104A-104N. Each user device 104A-104N is a data processing system 700 (presented in further detail below with respect to FIG. 7) and is owned, controlled, operated, and/or used by one or more users 102A-102N of the social networking system 130. For purposes of this disclosure and ease of understanding, each user device 104A-104N is utilized by one respective user 102A-102N, though this may not be true in operation. In many embodiments, each user device 104A-104N includes a display 106A-106N, which can be a cathode ray tube (CRT), liquid crystal display (LCD), light-emitting diode (LED) display, organic LED (OLED) display, or active-matrix OLED (AMOLED) display. However, it will be appreciated that other types of displays can be used.

In an embodiment of the invention, a first user 102A watches a performance of a video asset 110. The video asset 110 may be any type of video having a video track 112 comprising one or more frames of visual content, and may include but is not limited to animations (e.g., hand rendered art, computer generated imagery, three-dimensional objects), single or serial video shows (e.g., television shows), movies, clips, trailers, news programs, documentaries, infomercials, user-generated video content (e.g., recorded from a user's video camera recorder or device containing a video camera recorder such as a camera phone, digital camera, digicam, laptop, personal media player, or some other portable electronic device), videos generated using video editing software, and any other type of video content.

The video asset 110 includes a video track 112 including a visual aspect of the video asset 110, and may optionally include an audio track 114 including an auditory aspect of the video asset 110. The audio track 114, in FIG. 1, is depicted next to the video track 112 for ease of understanding; however, it is to be understood that the audio track 114, in many embodiments of the invention, is not presented using the display 106A of the user device 104A.

In embodiments of the invention, the video track 112 and/or the audio track 114 includes representations of entities, which are defined as a person, place, or thing (PPT). For example, a "person" may include a user of the social networking system 130, another person that is not a user of the social networking system 130, an actor or celebrity, a fictional or non-fictional character played by an actor, a musician or composer or director involved with the audio track 114, or a person involved in the making of the video asset 110 (e.g., film crew member, producer, director, assistant director, editor, engineer, costume designer, wardrobe supervisor, make-up artist). Further, an entity may be a "place", which in certain embodiments of the invention may include (but not be limited to) a city, region, state, country, building, region, park, continent, business, organization, monument, stadium, etc. Additionally, an entity may be a "thing", which in embodiments of the invention may include (but not be limited to) an activity, event, object, clothing, jewelry, commercial good available for sale, animals, plants, teams, sport, song, audio recording, musical genre, musical album, automobile, electronic device, etc. In the embodiment depicted in FIG. 1, the video track 112 includes several representations of PPTs including a dog named Toto 116B, a girl named Dorothy 116A, and a cowardly lion 116C; similarly, the audio track 114 includes representations of PPTs including a voice of Dorothy 116D, and perhaps other representations such as the voices of Toto and/or the cowardly lion, a soundtrack or song, a composer, director, or musician featured in the soundtrack, etc.

In various embodiments of the invention, the performance of the video asset 110 may occur using a display 106A of the user device 104A, a display of a different electronic device, or through a projection of the video asset 110 (e.g. using a movie projector or other opto-mechanical device for displaying motion picture film by projecting it onto a surface, such as a projection screen or wall). In embodiments of the invention where the video asset 110 includes an audio track 114, the performance of the video asset 110 may also utilize speaker devices/loudspeakers for producing audible sound of the audio track 114, which may be a part of the user device 104A or different electronic device, or connected (wired or wirelessly) to the user device 104A or different electronic device.

In an embodiment of the invention, the performance of the video asset 110 is initiated by the user 102A from within a user application (e.g., 660A) executed by the user device 104A. In one such embodiment, the user application 660A is communicatively coupled with the social networking system 130, and may be a web browser or special-purpose application. For example, the user 102A may use a browser user application 660A and click/select a link posted on the social networking system 130 to the video asset 110 by another user. However, in other embodiments of the invention, the performance of the video asset 110 is initiated by other means, such as (but not limited to) a user turning on a television or projector—perhaps using a remote control, using a digital video disc (DVD) or Blu-Ray player, or using a set-top box or another device to stream a video using the Internet or local network. In some embodiments of the invention, the video asset 110 (and/or set of PPT entries 132A-132N) is transferred to the user device 104A from an external server 615, and in other embodiments the video asset 110 (and/or set of PPT entries 132A-132N) is transferred to the user device 104A from the social networking system 130.

At circle '1' of FIG. 1, according to an embodiment of the invention, the social networking system 130 transmits, to the user device 104A, a set of PPT entries 132A-132N for the video asset 110. However, in some embodiments, the set of PPT entries 132A-132N are transmitted along with data of the video asset 110 and may be extra commands or data inserted within a stream of data of the video asset 110.

Each of the set of PPT entries 132A-132N includes an interaction point identifier 134 that can be used to identify particular points within the performance of the video asset 110 that include a representation of a PPT. For example, in the embodiment depicted in FIG. 1, each interaction point identifier 134 comprises a time value or timestamp that indicates a time, from the perspective of the beginning of the performance of the video asset 110, that a representation of a PPT occurs. In other embodiments, the interaction point identifiers 134 may instead be frame numbers, pointers, chapter numbers, or any other way known to those of skill in the art to refer to particular locations within a performance of a video asset 110. In the depicted embodiment of FIG. 1, each of the set of PPT entries 132A-132N also includes an interaction point descriptor 136 that describes the particular PPT in the video asset 110 at the point of that entry's interaction point identifier 134. In FIG. 1, each interaction point descriptor 136 includes an attribute name (e.g., Song, Character, Item for Purchase, Place, etc.) and one or more attribute values (e.g., "Over the Rainbow", "Ruby Slippers") for each of the attribute names.

At circle '2', the performance of the video asset 110 begins, and the display 106A may include a scrubber user interface (UI) element 118 and optionally other video controls (not illustrated) for use by the user 102A. In an embodiment, the scrubber (UI) element 118 presents a visual indication of the progress of the performance of the video asset 110, and may include a progress indicator element (illustrated in FIG. 1 as a small black circle). When the performance of the video asset 110 reaches an interaction point identifier 134 from the set of PPT entries 132A-132N (e.g., PPT entry 132B, with a time value interaction point identifier 134 of "0:22:12" and an attribute name and attribute value of the interaction point descriptor 136 of "Characters: Dorothy, Toto, Lion"), the display 106A will prompt the user 102A at circle '3' by generating an interaction UI prompt 120A. In the embodiment depicted in FIG. 1, the interaction UI prompt 120A is presented as a result of the performance of the video asset 110 reaching the "0:22:12" time point, which is the same as the interaction point identifier 134 of PPT entry 132B. The interaction UI prompt 120A may be populated based upon the interaction point descriptor 136 of that PPT entry 132B. In one example, the user 102A may be prompted with for a "check in" interaction type with the social networking system 130 due to the interaction point descriptor 136 including an attribute name of "Characters", and the attribute values of "Dorothy", "Toto", and "Lion" may be utilized in the interaction UI prompt 120A as a result. In some embodiments, each interaction point descriptor 136 identifies a particular interaction type and/or a particular interaction UI prompt 120A template to be used for prompting the user 102A.

The interaction UI prompt 120A depicted in FIG. 1 includes an icon, some text representing a prompt, and two interaction UI elements 122A (here, a "Yes" button and a "No" button, though many other types of UI elements—which are well known to those in the art—can be used, such as but not limited to sliders, checkboxes, toggles, text input boxes, dropdown selectors, etc.). In other embodiments, the interaction UI prompt 120A may include more or fewer items. In this depicted embodiment, if the user 102A selects the 'No' interaction UI element 122A, the interaction UI prompt 120A may simply be hidden. However, if the user 102A selects the 'Yes' interaction UI element 122A, an interaction message (not depicted) describing the interaction is transmitted, at circle '4', back to the social networking system 130. The interaction message may include one or more of an identifier of the user 102A, an identifier of the user action with respect to the interaction UI elements 122A (e.g., an indication that the user clicked the 'Yes' button), an identifier of the video asset 110, and an identifier of the PPT entry 132B and/or interaction point descriptor(s) 136.

At circle '5', responsive to receipt of the interaction message from the user device 104A, a post generation module 146 of the social networking system 130 may use data from the interaction message, and optionally data from other interaction messages received from the same user device 104A or other user devices (e.g., 104B-104N), from its store of PPT entries 132A-132N, from platform storage 625, and/or from social graph 640 (described below) to construct one or more posts 138A to be displayed to one or more other users (e.g., 102B-102N) of the social networking system 130. A post is a set of one or more items associated with one or more users of the social networking system 130, and may include text, images, videos, links, applications, and/or other objects. In the embodiment depicted in FIG. 1, the post 138A includes a user icon/photograph for user 102A, the name of the user 102A (e.g., "Jane Doe"), some text (e.g., "is exploring Oz with Dorothy, Toto, and Lion."), and an embedded object allowing the viewing user to watch (or launch a viewer to watch) a portion of the video asset 110 (optionally, at or near the time of the interaction point identifier 134 in the performance where the user 102A was prompted with the interaction UI prompt 120A). The post is transmitted, at circle '6', to one or more other user devices 104B-104N of one or more other users 102B-102N of the social networking system 130 to be displayed using displays 106B-106N. In this manner, the initial user 102A is prompted to interact with an entity (i.e., PPT) of the video asset 110, the interaction occurs, and one or more other users are able to observe the interaction, which perhaps will lead to further social networking system 130 interaction via the published posts. For example, upon seeing the post 138A that "Jane Doe is exploring Oz . . . ", other users may comment upon the post and create a discussion related to "Dorothy, Toto, and Lion."

In an embodiment of the invention, the set of PPT entries 132A-132N are received, by a Video Content Metadata (VCM) reception module 142 of a video content metadata module 140. The VCM reception module 142 may receive the PPT entries 132A-132N from another computing device through a network (e.g., from a server of a person or organization that created or publishes a particular video asset 110), or may receive the PPT entries 132A-132N from an Input/Output (I/O) device or peripheral of the social networking system 130, such as (but not limited to) a manual entry by a person using a keyboard and/or mouse.

In another embodiment, the set of PPT entries 132A-132N are automatically generated by the VCM module 140 using a VCM generation module 144. The VCM generation module 144 may, using the video asset 110, perform one or more of an analysis of the audio track 114 (e.g., using audio fingerprinting analysis modules) and/or video track 112 (e.g., using facial recognition modules, object recognition modules, and/or optical character recognition (OCR) modules) to identify representations of PPTs 116A-116N in the video asset 110, and generate the PPT entries 132A-132N as a result. In some embodiments, the VCM generation module 144 utilizes metadata already included within or with the video asset 110 to identify entities (i.e., PPTs). The VCM generation module may be configured to access the video asset 110 from a storage device (e.g., platform storage 625) of the social networking system 130, or access, using a physical network interface over a set of networks 620, the video asset 110 from an external server (e.g., 615). For example, in an embodiment, the VCM generation module 144 determines what a video asset 110 is (e.g., a popular movie) using metadata included with the video asset 110 file(s), obtain entity information for the video asset 110 from a third party server or local storage (e.g., obtain a list of actors, characters, directors, etc. from a movie database; and/or obtain known still images of those actors), and use the obtained entity information as training information with the analysis modules to "recognize" the actors within the video track 112 of the video asset 110, and generate the set of PPT entries 132A-132N.

Figure 2:
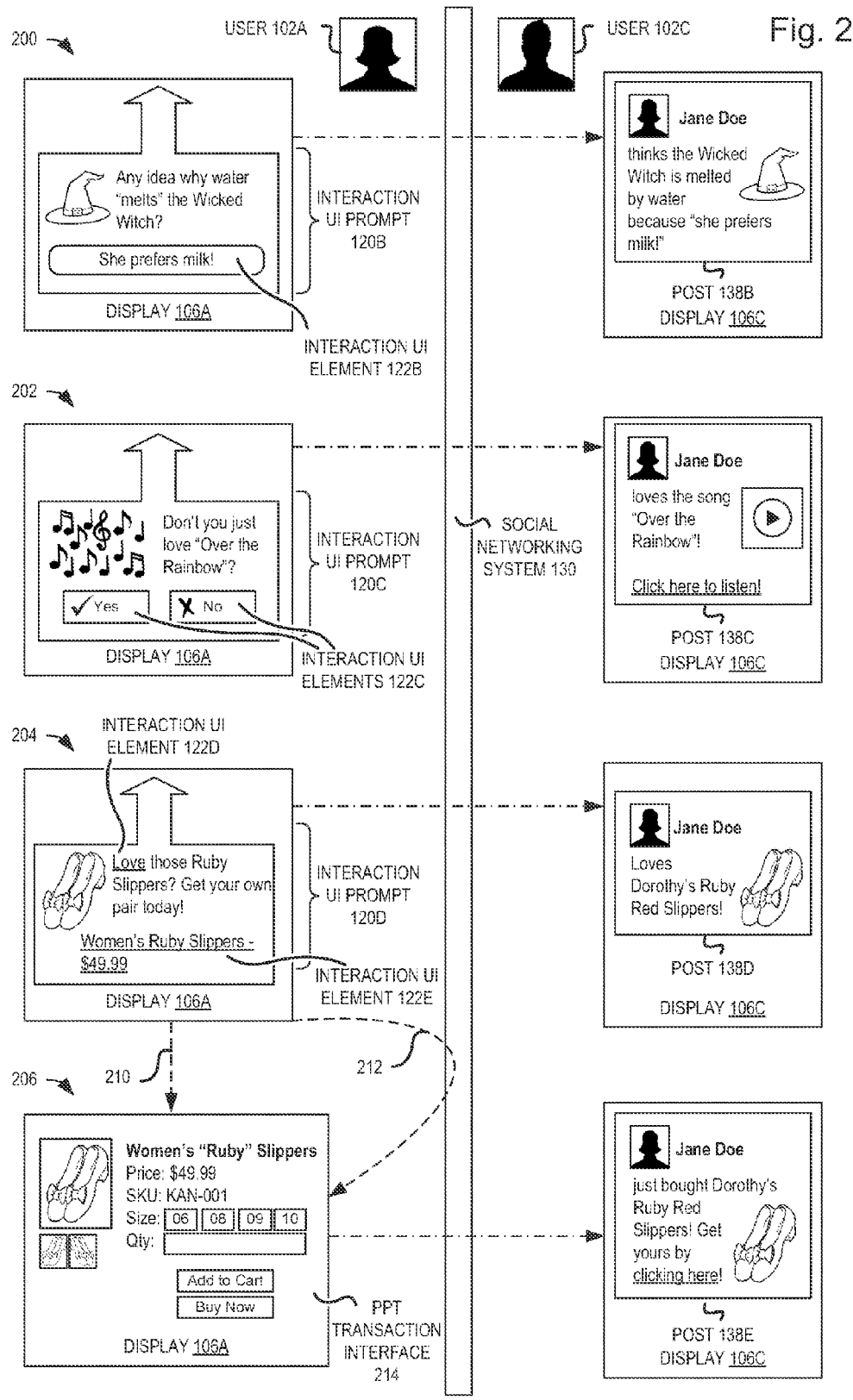
FIG. 2 is a block diagram illustrating flow sequences and user interfaces for prompting interactions with persons, places, and/or things depicted or included in video assets and generating posts in a social networking system according to an embodiment of the invention.

FIG. 2 is a block diagram illustrating flow sequences and user interfaces for prompting interactions with persons, places, and/or things depicted or included in video assets and generating posts in a social networking system according to an embodiment of the invention. The left side of FIG. 2 includes depictions of interfaces using a display 106A of a first user 102A, and the right side of FIG. 2 includes depictions of interfaces using a display 106C of a second user 102C. In the middle is a column labeled as the social networking system 130, which indicates that an action of the first user 102A will lead to actions occurring at the social networking system 130, which will ultimately lead to actions occurring at the display 106C of the second user 102C.

A first example is presented at 200, where the first user 102A, while playing a video asset 110, has reached the point in the presentation with an associated PPT entry including an interaction point identifier 134 of "1:21:33" and an interaction point descriptor 136 of "Character: Wicked Witch of the West". At this point, the first user 102A is prompted for interaction with the interaction UI prompt 120B asking for the first user's 102A comments about that character. The interaction UI prompt 120B includes a text input box interaction UI element 122B, in which the first user 102A has entered a comment. At this point, the social networking system 130 is notified of the interaction, and in response generates a post 138B for the second user 102C that describes the first user 102A (i.e., the icon and user name), the PPT (e.g., the "Wicked Witch of the West"), and the user's input.

A second example is presented at 202, where the first user 102A, while playing a video asset 110, has reached the point in the presentation with an associated PPT entry including an interaction point identifier 134 of "0:12:14" and an interaction point descriptor 136 of "Song: Over the Rainbow". At this point, the first user 102A is prompted for interaction with the interaction UI prompt 120C asking for the first user's 102A preferences about that song. The interaction UI prompt 120C includes two interaction UI element 122C buttons ('Yes' and 'No' that the first user 102A may select between. Assuming the first user 102A selects the 'Yes' button, the social networking system 130 is notified of the interaction, and in response generates a post 138C for the second user 102C that describes the first user 102A (i.e., the icon and user name), the PPT (e.g., the song "Over the Rainbow"), and the user's input (e.g. "love" of the song). The post 138C also includes a UI element link (and embedded object) allowing the second user 102C to load, from the social networking system 130 or another third party server, that particular song for listening.

A third example is presented at 204, where the first user 102A, while playing a video asset 110, has reached the point in the presentation with an associated PPT entry including an interaction point identifier 134 of "0:37:43" and an interaction point descriptor 136 of "Item for Purchase: Ruby Slippers". At this point, the first user 102A is prompted for interaction with the interaction UI prompt 120D asking for the first user's 102A preferences about that item, and asking if the first user 102A wishes to purchase that item. The interaction UI prompt 120D includes two interaction UI elements that the first user 102A may select between: a 'Love' link 122D and a purchase link 'Women's Ruby Slippers—$49.99' 122E.

Assuming the first user 102A selects the 'Love' link 122D, the social networking system 130 is notified of the interaction, and in response generates a post 138D for the second user 102C that describes the first user 102A (i.e., the icon and user name), the PPT (e.g., the item "Ruby Slippers"), and the user's input (e.g. "love" of the item).

Assuming the first user 102A instead selects the purchase link 122E, the display 106A for the first user 102A may change to the PPT transaction interface 214 to allow the first user 102A to begin a purchasing transaction of the item. In various embodiments, this change includes opening a web page of a storefront (e.g., a home page, an item detail page) selling the item without interacting with the social networking system 130 to do so (see, e.g., arrow 210) or with interacting with the social networking system 130 (see, e.g., arrow 212), opening a new UI element to allow the first user 102A to purchase the item through the social networking system 130 (see, e.g., arrow 212), or launching another application to allow the first user 102A to purchase the item. At some point, the social networking system 130 is notified of the selection of the purchase interaction UI element 122E—in an embodiment, this occurs after that UI element is selected, but in some embodiments this occurs after the first user 102A has actually purchased the item using one of the above (or other) purchasing methodologies. In response, the social networking system 130 generates a post 138E for the second user 102C that describes the first user 102A (e.g., the icon and the user name), the PPT (e.g., the item "Ruby Slippers"), and the user's input/action (e.g., the purchase of the slippers). In the depicted example, the post 138E also includes a UI element allowing the second user 102C to also purchase the ruby slippers—"Get yours by clicking here!".

FIG. 3 is a block diagram illustrating flow sequences and user interfaces for prompting interactions with persons, places, and/or things depicted or included in video assets and generating aggregated posts in a social networking system according to an embodiment of the invention.

The top portion of FIG. 3, as indicated by arrow 300, illustrates an embodiment of the invention for generating aggregated posts based upon multiple prompted video content interactions for a particular video asset 110 and interaction point. In this embodiment, multiple users 102A-102C view a performance of a particular video asset (e.g., 110) and reach a first interaction point with an associated PPT entry. In some embodiments, each of the users 102A-102C views the performance on a different user device, but in some embodiments each user views the presentation on just one user device, and in other embodiments the presentation using a completely different system. Regardless of the means for presenting the video asset 110, upon reaching the first interaction point, each user 102A-102C is prompted for an interaction with a respective interaction UI prompt 120A.1-120A.3 on a respective user device 104A-104C. Assuming each user selects the 'Yes' interaction UI element button, the social networking system 130 will be notified after each such selection. In this embodiment, the social networking system 130, using the post generation module 146 of FIG. 1, will aggregate these interactions and generate a post 338A for one or more other users (e.g., 102D). In the depicted embodiment, the post 338A describes the three users 102A-102C (e.g., "Jane Doe and 2 of your friends") and the PPT (e.g., the characters Dorothy, Toto, and Lion). The post 338C also includes an embedded object allowing the user 102D to view some or all of the video asset 110.

The bottom portion of FIG. 3, as indicated by arrow 305, illustrates an embodiment of the invention for generating an aggregated post based upon multiple prompted interactions from just one user. In this embodiment, user 102A views the performance of a video asset 110, reaches at least three interaction points, and is prompted at least three times with interaction UI prompts (120A, 120D, 120C). The social networking system 130 then aggregates these multiple interactions, from one user 102A viewing one video asset 110, into one post 338B to be displayed to one or more other users (e.g., user 102D) of the social networking system 130. This aggregated post 338B describes the user 102A (e.g., the user icon and user name) and the three different interactions with the multiple PPTs: "Dorothy, Toto, and Lion"; "Ruby Slippers"; and "Over the Rainbow."

Figure 4:
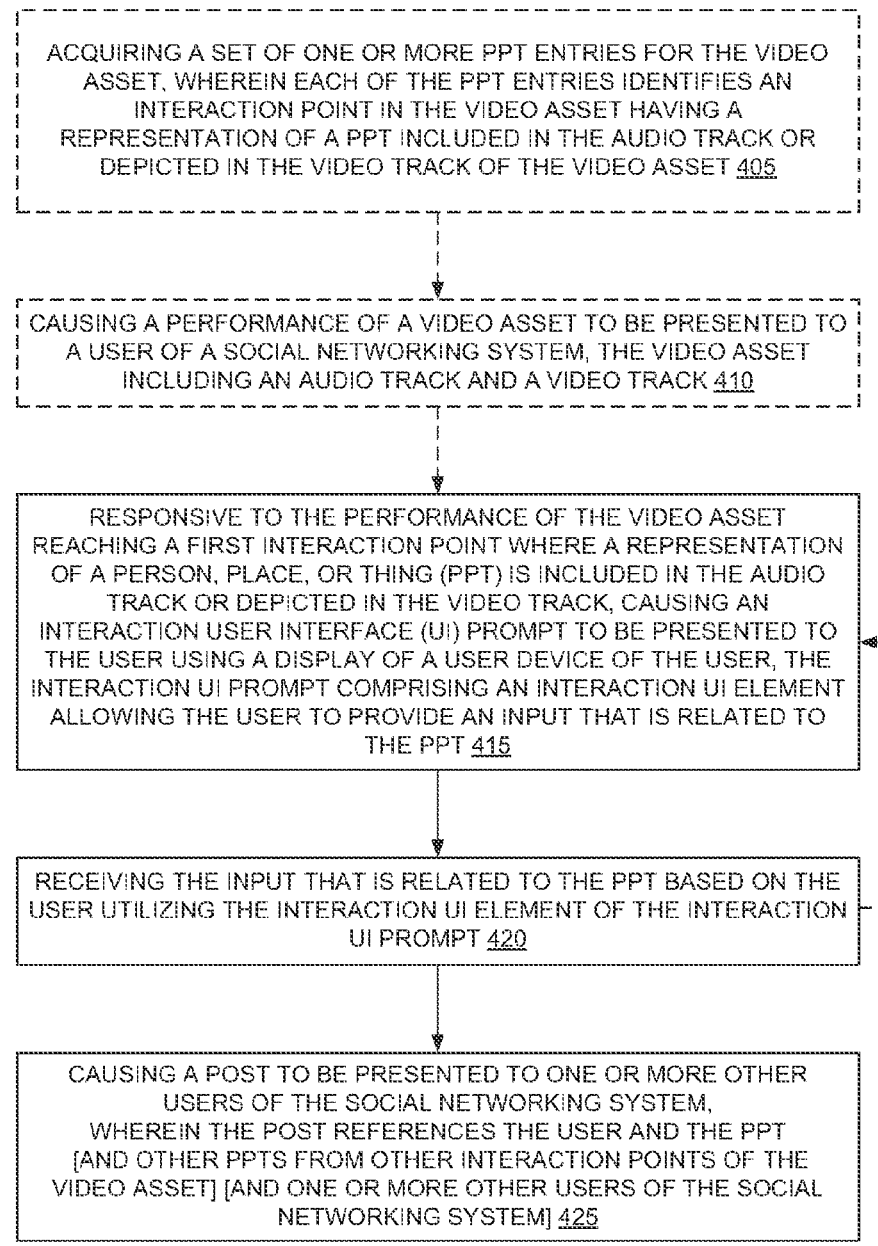
FIG. 4 is a flow diagram illustrating a flow for prompting social video content interaction according to an embodiment of the invention.

FIG. 4 is a flow diagram illustrating a flow 400 for prompting social video content interaction according to an embodiment of the invention. At block 405, the flow 400 optionally includes acquiring a set of one or more PPT entries for a video asset, wherein each of the PPT entries identifies an interaction point in the video asset having a representation of a PPT included in the audio track or depicted in the video track of the video asset. In some embodiments, each PPT entry further includes an interaction point descriptor indicating a type of PPT for that entry (i.e., an attribute name) and a name of the PPT (i.e., an attribute value). In some embodiments, each PPT entry further includes a template for the interaction UI prompt (e.g., 120A) to be generated for that PPT entry, and in some embodiments, each PPT entry further includes a template for the post(s) (e.g., 138A) to be generated for the other users of the social networking system 130 responsive to receiving an interaction message sent responsive to a user providing an input to an interaction UI prompt. In some embodiments of the invention, acquiring 405 includes performing an audio fingerprinting analysis of the audio track of the video asset, and/or performing a visual object recognition analysis of the video track of the video asset.

At block 410, the flow 400 optionally includes causing a performance of a video asset (e.g., 110) to be presented to a user of a social networking system. The video asset includes an audio track and a video track. In some embodiments, the performance occurs using a user device of the user, but in other embodiments, the performance occurs using another device or another system. For example, in an embodiment, the performance of the video asset occurs using a display of one user device (e.g., a television coupled to a media streaming device) and the interaction UI prompts are displayed using a display of a separate user device (e.g., a laptop or mobile telephone); this may be implemented by having both user devices be associated with one user account of the social networking system 130, for example. In other embodiments of the invention not utilizing block 410, the performance of the video asset may not be initiated through the social networking system 130. For example, the performance of the video asset 110 may occur through a projector at a theater or through broadcast television. In such embodiments, the social networking system 130 and/or the user application (e.g., 660A, discussed later herein) of the user device (e.g., 104A) will synchronize the playback of the video asset with the interaction points of the set of PPT entries in various ways, which include but are not limited to determining a start of playback of the video asset based upon one or more of the user's geographic location (e.g., at a movie theater, in the Pacific Time Zone, etc.), the user's stated actions (e.g., a post or "check in" from the user describing the video asset), time of day (e.g., television or movie listing information), etc.

At block 415, the flow 400 includes, responsive to the performance of the video asset reaching a first interaction point where a representation of a person, place, or thing (PPT) is included in the audio track or depicted in the video track, causing an interaction user interface (UI) prompt to be presented to the user using a display of a user device of the user. The interaction UI prompt comprises an interaction UI element allowing the user to provide an input that is related to the PPT. In various embodiments, the PPT may comprise a fictional or non-fictional character, a song played in the video asset, a good or service depicted in the video asset, or apparel or jewelry depicted in the video asset.

Then, at block 420, the flow 400 includes receiving the input that is related to the PPT based on the user utilizing the interaction UI element of the interaction UI prompt. Optionally, flow continues back to block 415 for one or more subsequent iterations. Ultimately, flow 400 further includes, at block 425, causing a post that references the user and the PPT to be presented to one or more other users of the social networking system.

Figure 5:
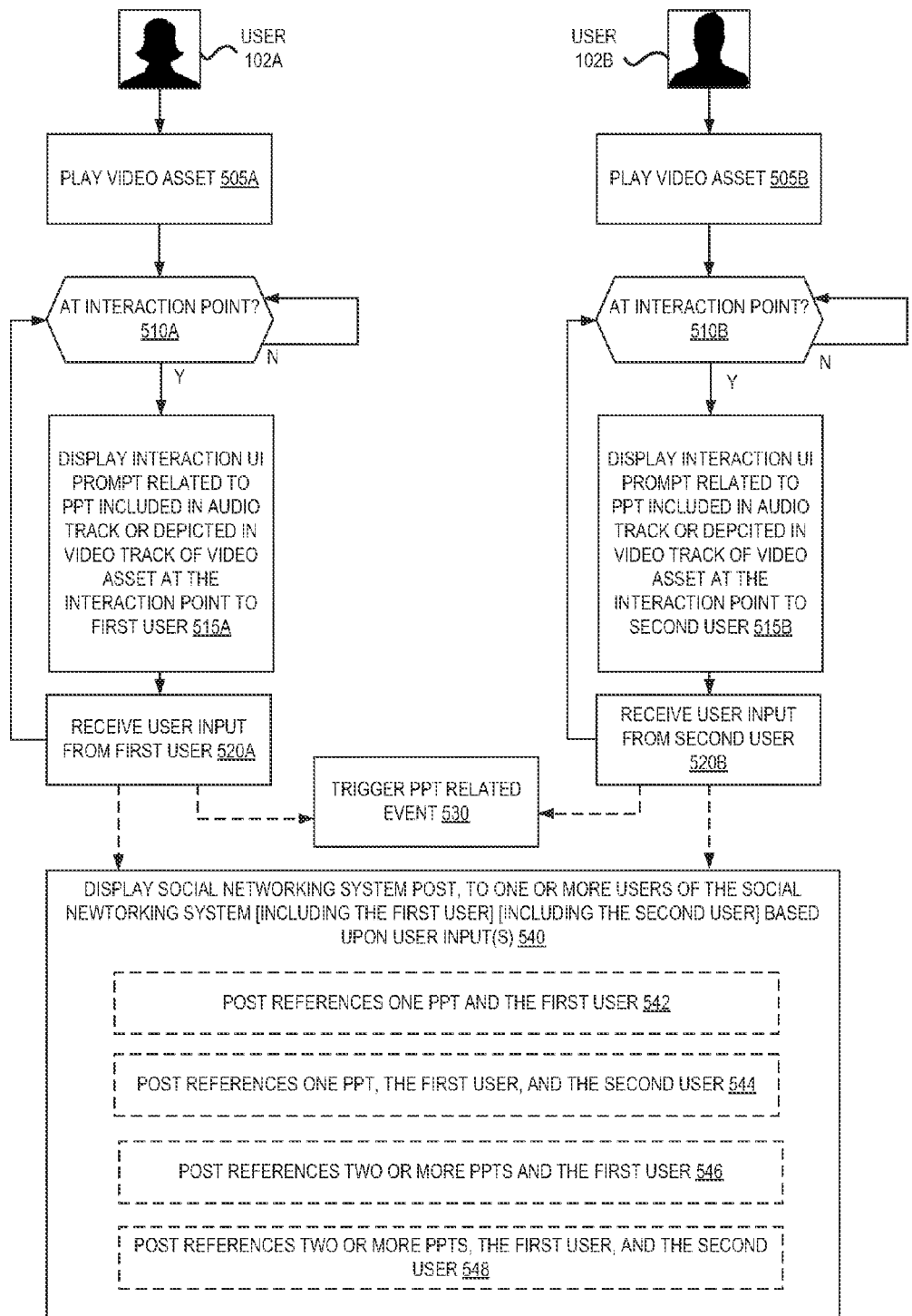
FIG. 5 is a flow diagram illustrating prompted social interaction for a plurality of users with the content of a video asset according to an embodiment of the invention.

FIG. 5 is a flow diagram illustrating prompted social interaction for a plurality of users with the content of a video asset according to an embodiment of the invention. Though FIG. 5 is presented in the context of two users 102A and 102B, it is to be understood that these flows are equally applicable to scenarios with more than two users.

In FIG. 5, both a first user 102A and a second user 102B play (i.e., view a performance of) a video asset at blocks 505A-505B. Then, while the performance is not at an interaction point, the flows loop (see arrows 'N' at 510A-510B) until an interaction point is detected (see arrows 'Y'). At blocks 515A-515B, each user is displayed an interaction UI prompt related to a PPT included in an audio track or depicted in a video track of the video asset at the first interaction point, to the respective user. At blocks 520A-520B, a user input from each user made using each interaction UI prompt, is received. The user input is related to the PPT, and may include (but is not limited to) input data related to the user's opinion of the PPT, thoughts about the PPT, preference of the PPT (e.g., like, dislike), a "check-in" with the PPT to indicate that the user and the PPT are in some way connected, an indication of a desire for the user to "follow" the PPT (and thus subscribe to receiving updates about or from the PPT), an indication of a desire to purchase the PPT, etc. From block 520B, the flow might continue back to block 510A-510B, where each user 102A-102B continues to watch the video asset. In some embodiments, optionally a PPT-related event may be triggered 530, which can include opening an interface on the respective user device to allow the user to purchase the PPT (e.g., such as when the PPT is a commercially available good or service) or to receive more information about the PPT. In some embodiments, at some point after receiving user inputs from one or both of the first user (i.e., block 520A) and the second user (i.e., block 520B), the flow includes displaying 540, based upon one or more of the user inputs, a social networking system post to one or more users of the social networking system. The one or more users may include one or both of users 102A-102B, and/or may include other users of the social networking system. For example, the one or more users may include users that are "friends" (i.e., directly connected to) of either user 102A or 102B.

In an embodiment, the post will reference 542 one PPT as well as the first user 102A. In another embodiment, the post will reference 544 one PPT as well as both the first user 102A and the second user 102B. In some embodiments, the post will reference 546 two or more PPTs (perhaps from user inputs from the first user 102A resulting from interaction UI prompts from different interaction points) and the first user 102A. In some embodiments, the post will reference 548 two or more PPTs (perhaps from user inputs from the first user 102A and the second user 102A resulting from interaction UI prompts from different interaction points) and the first user 102A and the second user 102A.

Social Networking Systems

A social networking system may store records of users and relationships between users in a social graph comprising a plurality of nodes and a plurality of edges connecting the nodes. The nodes may comprise a plurality of user nodes and a plurality of concept nodes.

A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node of the social graph may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes in the social graph may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's device and select a selectable button, causing the user device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as part of "wall posts", "timeline posts", and/or "stories", which can include text, objects, and/or multimedia files, etc.) or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 6:
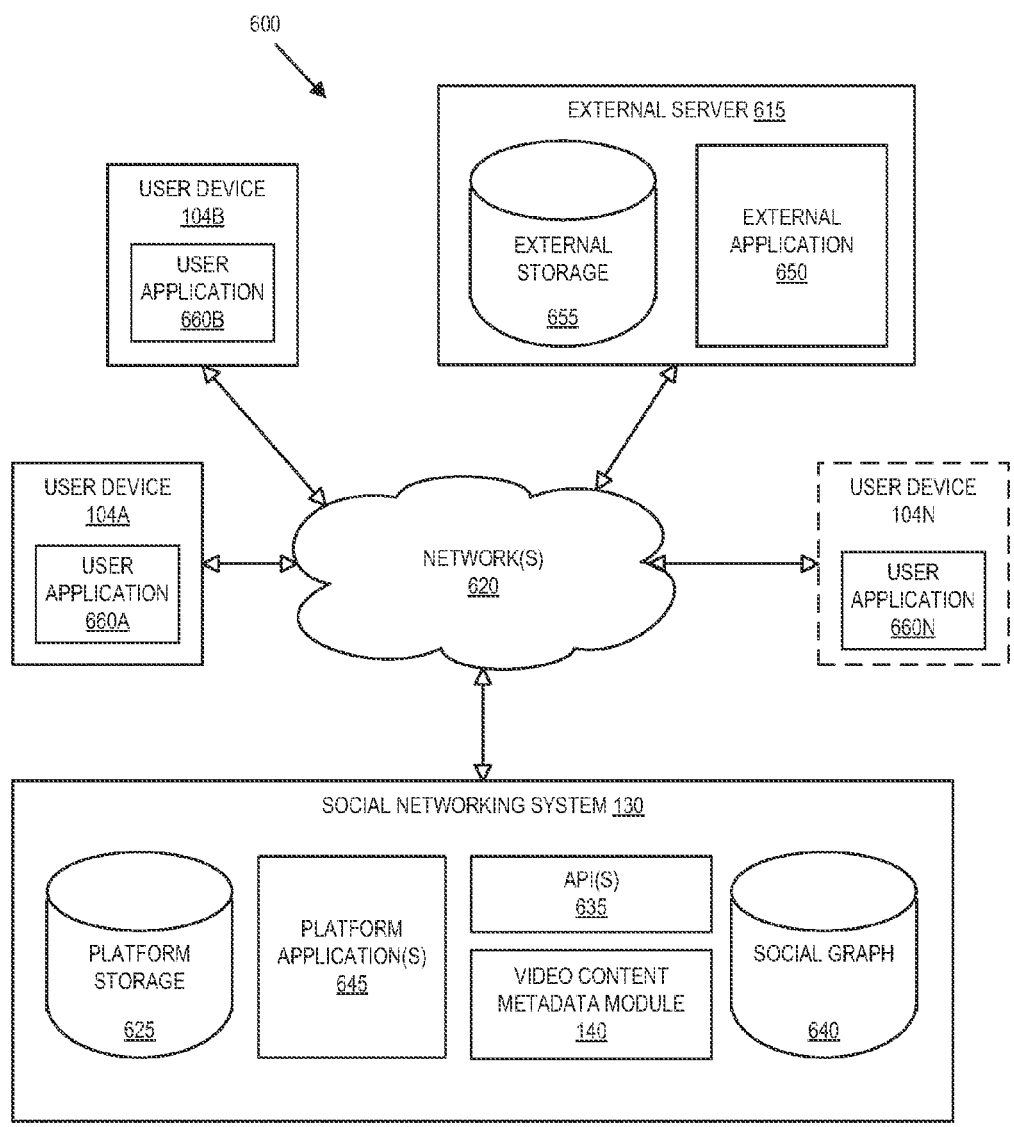
FIG. 6 is a block diagram illustrating an exemplary social network.

FIG. 6 illustrates, in block diagram form, an exemplary social network 600. The exemplary social network 600 includes user devices 104A-104N, a social networking system 130, and an external server 615 coupled to one or more networks 620. A user interacts with the social networking system 130 using a user device (e.g., 104A), such as a desktop computer, laptop computer, tablet computer, personal digital assistant (PDA), in- or out-of-car navigation system, smart phone or other cellular or mobile phone, or mobile gaming device, among other suitable computing devices. For example, the user device 104A communicates with the social networking system 130 via an application (e.g., 660A) such as a web browser (e.g., Microsoft Windows Internet Explorer, Mozilla Firefox, Apple Safari, Google Chrome, Opera, etc.) or native application (e.g., Facebook for iPhone or iPad, Facebook for Android, etc.).

Typical interactions between the user device 104A and the social networking system 130 include receiving publications, operations to view profiles of other users of the social networking system 130, contributing and interacting with media items, joining groups, listing and confirming attendance at events, checking in at locations, liking certain pages/posts, creating pages, and performing other tasks that facilitate social interaction, as described herein. Each of these interactions is an exemplary interaction of a user accessing the social networking system 130 as a network service.

The social networking system 130 includes platform storage 625, a video content metadata module 140 (as described earlier herein), one or more application programming interfaces (API's) 635, a social graph 640 (e.g., as described earlier herein), and one or more platform applications 645. Platform storage 625 can store user preferences/settings, profile data, PPT entries 132A-132N, etc. Exemplary platform applications 630 include the platform for social interactions (e.g., publishing posts, pictures, etc.) as well as social games, messaging services, and any other application that uses the social platform provided by the social networking system 130. The social graph 640 may store user nodes, concept nodes, and edges between nodes as described earlier herein. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes. In particular embodiments, the social networking system 130 may comprise one or more computing devices (e.g., servers) hosting functionality directed to operation of the social networking system.

One or more API's 635 enable external applications 650 to work with the social networking system 130. For example, an external application 650 utilizes an API 635 to authenticate a user based upon the user's social networking log in username and password. Additionally, an external application 650 utilizes one or more API's 635 to run the application within the platform application 630, to publish a post to the platform application, to access the user's social network connections in the social graph 640, etc. In one embodiment, the methods described above, or portions thereof, are performed by an external application 650 and data is received from and/or stored in one or more of the external storage 655, platform storage 625, and social graph 640.

Data Processing System Components

Figure 7:
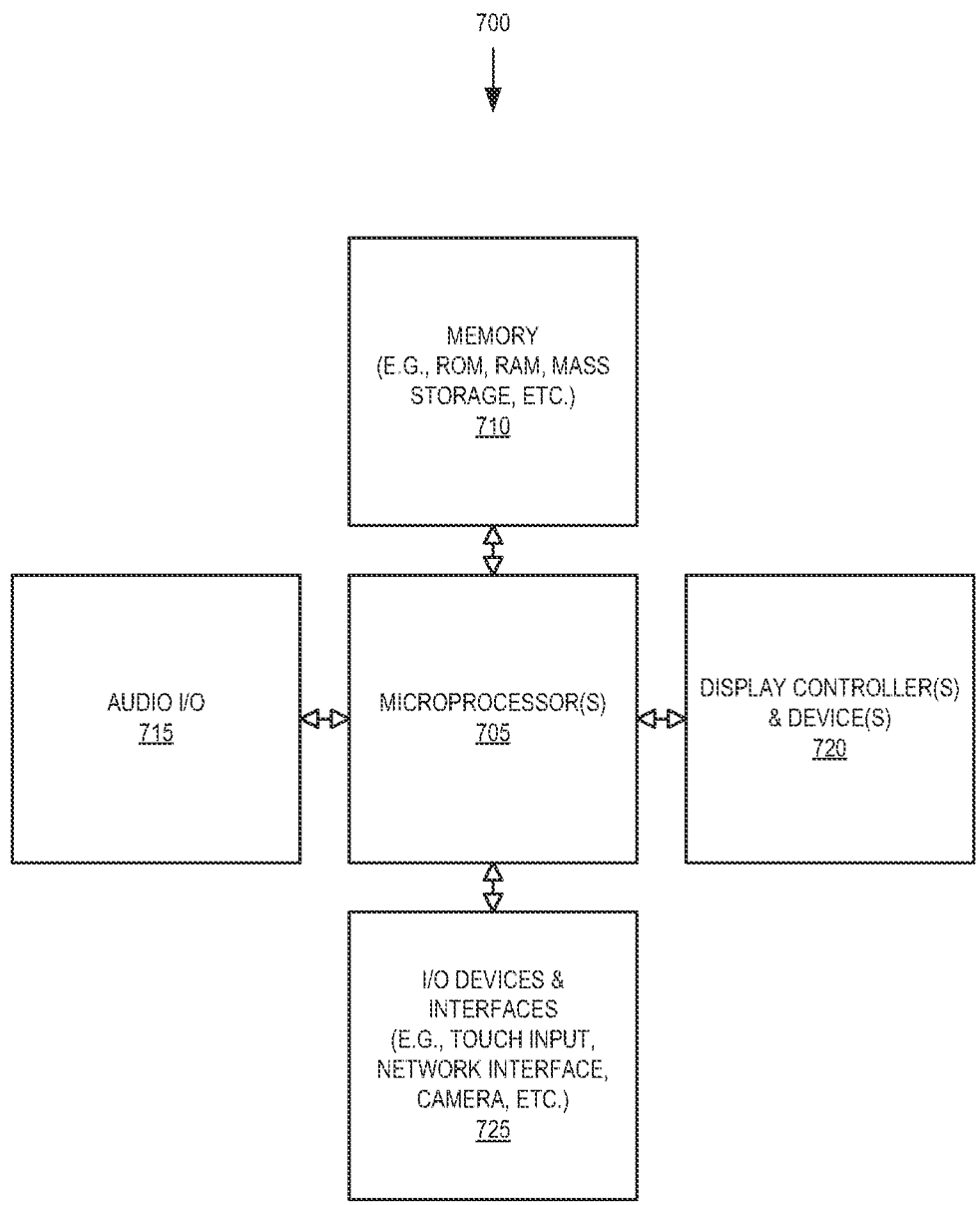
FIG. 7 illustrates a block diagram for an exemplary processing system to provide social network functionalities according to an embodiment of the invention.

FIG. 7 illustrates a block diagram for an exemplary data processing system 700 to provide social network functionalities according to an embodiment of the invention. Data processing system 700 includes one or more microprocessors 705 and connected system components (e.g., multiple connected chips). Alternatively, the data processing system 700 is a system on a chip.

The data processing system 700 includes memory 710, which is coupled to the microprocessor(s) 705. The memory 710 may be used for storing data, metadata, and programs for execution by the microprocessor(s) 705. The memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 710 may be internal or distributed memory.

The data processing system 700 also includes an audio input/output subsystem 715 which may include a microphone and/or a speaker for, for example, playing back music or other audio, receiving voice instructions to be executed by the microprocessor(s) 705, playing audio notifications, etc. A display controller and display device 720 provides a visual user interface for the user, e.g., GUI windows.

The data processing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 700.

The I/O devices and interfaces 725 may also include a connector for a dock or a connector for a USB interface, FireWire, Thunderbolt, Ethernet, etc. to connect the system 700 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 700 with another device, external component, or a network and receive stored instructions, data, tokens, etc. It will be appreciated that one or more buses may be used to interconnect the various components shown in FIG. 7.

The data processing system 700 is an exemplary representation of a user device (e.g., 104A), but any of these features may also be utilized by one or more devices implementing the social networking system 130. The data processing system 700 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, or devices which combine aspects or functions of these devices, such as a media player combined with a PDA and a cellular telephone in one device. In other embodiments, the data processing system 700 may be a network computer, server, or an embedded processing device within another device or consumer electronic product. As used herein, the terms computer, system, device, processing device, and "apparatus comprising a processing device" may be used interchangeably with the term data processing system 700 and include the above-listed exemplary embodiments.

It will be appreciated that additional components, not shown, may also be part of the system 700, and, in certain embodiments, fewer components than that shown in FIG. 7 may also be used in a data processing system 700. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 710 or other non-transitory machine-readable storage medium. The software may further be transmitted or received over a network (not shown) via a network interface device 725. In various embodiments, hardwired circuitry may be used in combination with the software instructions to implement the present embodiments. Thus, the techniques are not limited to any specific combination of hardware circuitry and software, or to any particular source for the instructions executed by the data processing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

While these methods, systems, and user interfaces utilize both publicly available information as well as information provided by users of the social networking system, all use of such information is to be explicitly subject to all privacy settings of the involved users and the privacy policy of the social networking system as a whole. Additionally, while embodiments of the invention presented herein include video content having an audio track and a video track, in other embodiments these user interfaces, methods, and systems can be used with audio content without an associated video track, or with video content without an associated audio track.

In the foregoing description, numerous specific details are set forth. However, it is understood that embodiments of the invention may be practiced without these specific details. References in this specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the foregoing description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the term "module" is used throughout the description and may refer to a hardware circuit and/or software stored in memory to be run on a processor. It should be noted that one or more modules may be combined or have their functionality further broken down.

Bracketed text and blocks with dashed borders (e.g., large dashes, small dashes, dot-dash, dots) are used herein to illustrate optional operations or components that add additional features to embodiments of the invention. However, such notation should not be taken to mean that these are the only options or optional operations, and/or that blocks with solid borders are not optional in certain embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method, comprising:
responsive to a performance of a video asset reaching a first interaction point where a representation of a person, place, or thing (PPT) is included in an audio track of the video asset or depicted in a video track of the asset, causing a first interaction user interface (UI) prompt to be presented to a first user of a social networking system using a display, the first interaction UI prompt comprising a first interaction UI element allowing the first user to provide a first input that is related to the PPT;
receiving the first input that is related to the PPT based on the first user utilizing the first interaction UI element of the first interaction UI prompt;
responsive to a second performance of the video asset reaching the first interaction point, causing a second interaction UI prompt to be presented to a second user of the social networking system using a second display of a second user device, the second interaction UI prompt comprising a second interaction UI element allowing the second user to provide a second input that is related to the PPT;
receiving the second input that is related to the PPT based on the second user utilizing the second interaction UI element of the second interaction UI prompt; and
causing a post to be presented to one or more other users of the social networking system in response to the first and second inputs, wherein the post references both of the first and second users and the PPT based upon an aggregation of the first and second inputs.

2. The method of claim 1, further comprising:
causing the performance of the video asset to be presented to the first user of the social networking system.

3. The method of claim 1, further comprising:
acquiring a set of one or more PPT entries for the video asset, wherein each of the PPT entries identifies an interaction point in the video asset having a representation of a PPT included in the audio track or depicted in the video track of the video asset.

4. The method of claim 3, wherein at least one PPT entry of the set of PPT entries is automatically generated based on at least one of:
an audio fingerprinting analysis of the audio track of the video asset; and
a visual object recognition analysis of the video track of the video asset.

5. The method of claim 1, further comprising:
responsive to the performance of the video asset reaching a second interaction point where a second representation of a second PPT is included in the audio track or depicted in the video track, causing a second interaction UI prompt to be presented to the first user using the display of the user device, the second interaction UI prompt comprising a second interaction UI element allowing the first user to provide a second input that is related to the second PPT, wherein the second PPT is different than the PPT; and
receiving the second input that is related to the second PPT based on t the first user utilizing the second interaction UI element of the second interaction UI prompt, wherein the post further references the second PPT.

6. The method of claim 1, wherein the performance of the video asset utilizes the display of the user device.

7. The method of claim 1, wherein the performance of the video asset utilizes a different display that is not the display of the user device.

8. The method of claim 1, wherein the PPT comprises a fictional character.

9. The method of claim 1, wherein the PPT comprises a song.

10. The method of claim 1, wherein the PPT comprises a good or service.

11. The method of claim 10, wherein the PPT comprises apparel or jewelry.

12. A non-transitory computer-readable storage medium storing instructions that, when executed by a processor, cause a processor to perform operations comprising:
responsive to a performance of a video asset reaching a first interaction point where a representation of a person, place, or thing (PPT) is included in an audio track of the video asset or depicted in a video track of the asset, causing a first interaction user interface (UI) prompt to be presented to a first user of a social networking system using a display, the first interaction UI prompt comprising a first interaction UI element allowing the first user to provide a first input that is related to the PPT;
receiving the first input that is related to the PPT based on the first user utilizing the first interaction UI element of the first interaction UI prompt;
responsive to a second performance of the video asset reaching the first interaction point, causing a second interaction UI prompt to be presented to a second user of the social networking system using a second display of a second user device, the second interaction UI prompt comprising a second interaction UI element allowing the second user to provide a second input that is related to the PPT;
receiving the second input that is related to the PPT based on the second user utilizing the second interaction UI element of the second interaction UI prompt; and
causing a post to be presented to one or more other users of the social networking system in response to the first and second inputs, wherein the post references both of the first and second users and the PPT based upon an aggregation of the first and second inputs.

13. The non-transitory computer-readable storage medium of claim 12, wherein the operations further comprise:
causing the performance of the video asset to be presented to the first user of the social networking system.

14. The non-transitory computer-readable storage medium of claim 12, wherein the operations further comprise:
acquiring a set of one or more PPT entries for the video asset, wherein each of the PPT entries identifies an interaction point in the video asset having a representation of a PPT included in the audio track or depicted in the video track of the video asset.

15. The non-transitory computer-readable storage medium of claim 14, wherein:
the PPT is a good or service; and
the input causes the first user to begin a purchase transaction for the PPT using the user device.

16. An apparatus, comprising:
a processing device, wherein the processing device executes instructions that cause the apparatus to:
responsive a performance of a video asset reaching a first interaction point where a representation of a person, place, or thing (PPT) is included in an audio track of the video asset or depicted in a video track of the video asset, cause a first interaction user interface (UI) prompt to be presented to a first user of a social networking system using a display, the first interaction UI prompt comprising a first interaction UI element allowing the first user to provide a first input that is related to the PPT,
receive the first input that is related to the PPT based on the first user utilizing the first interaction UI element of the first interaction UI prompt,
responsive to a second performance of the video asset reaching the first interaction point, cause a second interaction UI prompt to be presented to a second user of the social networking system using a second display of a second user device, the second interaction UI prompt comprising a second interaction UI element allowing the second user to provide a second input that is related to the PPT,
receive the second input that is related to the PPT based on the second user utilizing the second interaction UI element of the second interaction UI prompt, and
cause a post to be presented to one or more other users of the social networking system in response to the first and second inputs, wherein the post references both of the first and second users and the PPT based upon an aggregation of the first and second inputs.

17. The apparatus of claim 16, wherein the instructions further cause the apparatus to:
receive a second input that is related to a second PPT based on the first user utilizing a second interaction UI element of a second interaction UI prompt, wherein the second PPT is not the same as the PPT, and
wherein the post further references the second PPT.

18. The apparatus of claim 16, wherein the instructions further cause the apparatus to:
acquire a set of one or more PPT entries for the video asset, wherein each of the PPT entries identifies an interaction point in the video asset having a representation of a PPT included in the audio track or depicted in the video track of the video asset.

* * * * *